United States Patent [19]
Hayashi et al.

[11] Patent Number: 4,910,419
[45] Date of Patent: Mar. 20, 1990

[54] OVERLOAD DETECTION MECHANISM FOR MOTOR-DRIVEN LINEAR ACTUATOR

[75] Inventors: Shuji Hayashi, Osaka; Kenichiro Nakamura, Ohtsu, both of Japan

[73] Assignee: Tsubakimoto Chain Co., Japan

[21] Appl. No.: 316,729

[22] Filed: Feb. 28, 1989

[30] Foreign Application Priority Data

May 16, 1988 [JP] Japan ............................. 63-63359[U]

[51] Int. Cl.⁴ ...................... H02K 41/00; F16D 71/00
[52] U.S. Cl. ......................................... 310/13; 310/23;
335/258; 192/143
[58] Field of Search ...................... 310/12, 13, 23, 30;
192/143, 138; 335/258, 257, 263

[56] References Cited
U.S. PATENT DOCUMENTS 4,282,501  8/1981  Myers ................................... 335/261
4,763,219  8/1988  Nakamura .............................. 361/23
4,766,405  8/1988  Daly et al. ........................... 335/257

FOREIGN PATENT DOCUMENTS 1354971  1/1963  France ................. 192/143
0596739  3/1978  U.S.S.R. ............... 192/143

Primary Examiner—Patrick R. Salce
Assistant Examiner—Judson H. Jones
Attorney, Agent, or Firm—Howson & Howson

[57] ABSTRACT

In a linear actuator comprising a motor-driven screw shaft, an overload detection mechanism comprises a pair of cup-shaped spring seats with substantially cylindrical portions. The spring seats are mounted at one end of the screw shaft by a pair of bearings and have a spring therebetween under a predetermined preload. Limit switches are provided for detecting overload on the screw shaft as a result of axial movement of the spring seats. The cylindrical portions of the cup-shaped spring seats serve as strikers for said limit switch means.

6 Claims, 2 Drawing Sheets

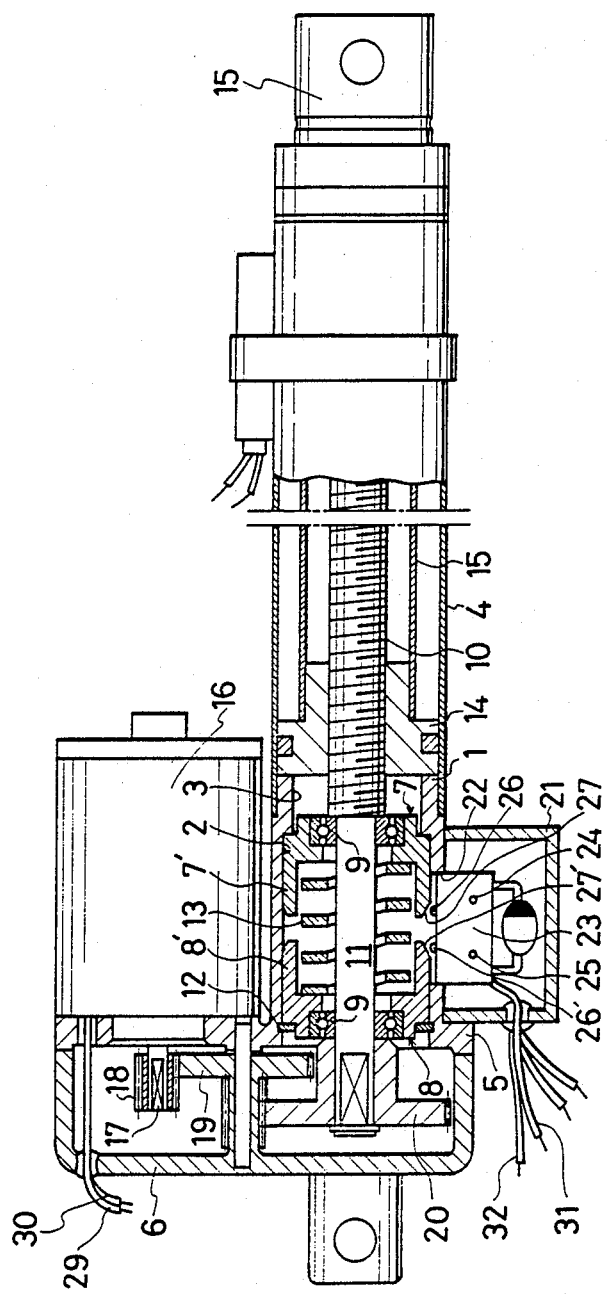
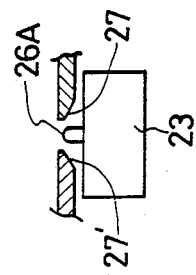

4,910,419

OVERLOAD DETECTION MECHANISM FOR MOTOR-DRIVEN LINEAR ACTUATOR

BRIEF SUMMARY OF THE INVENTION

This invention relates to linear actuators of the type in which rotation of a motor-driven screw shaft is translated into linear motion by means of a travelling, non-rotating nut. The invention is particularly concerned with an overload detection mechanism for such an actuator.

In this type of motor-driven linear actuttor, an overload detection mechanism is required in order to stop the drive motor at the ends of the stroke, and also to stop the motor when an excessive load is encountered in the midst of a stroke.

In some prior linear actuators, overload detection was accomplished by means of cup-shaped spring seats mounted at one end of the screw shaft of the actuator by a pair of bearings. A spring having a predetermined preload was held between the spring seats. Strikers attached to the spring seats were provided to actuate a limit switch. This prior overload detection mechanism, however, had a high manufacturing cost primarily because of the necessity for mounting strikers on the spring seats, machining the spring seats for mounting of the strikers, and machining a groove in a bracket to allow the strikers to slide. This prior overload detection mechanism had additional drawbacks in that it required the spring seats to have thick walls in order to mount the strikers and in that the provision of the strikers on the spring seats resulted in a bulky assembly overall.

The principle objects of this invention are to provide a much simpler overload detection mechanism, which is less costly to manufacture and more compact, and which generally overcomes the aforementioned drawbacks of the prior art.

The overload protection mechanism of the present invention comprises a pair of cup-shaped spring seats mounted at one end of a screw shaft by means of bearings, and a preloaded spring held between the spring seats. It is characterized in that the axially-extending parts of the spring seats themselves serve as strikers for the limit switch or switches, thereby providing a simpler and more compact overload detection mechanism.

BRIEF DESCRIPTION OF THE DRAWINGS

FIG. 1 is a side elevation, partly in section, showing an actuator having an overload detection mechanism in accordance with a first embodiment of the invention;

FIG. 3 is a fragmentary elevation, partly in section showing a modified embodiment of the mechanism of FIG. 1.

DETAILED DESCRIPTION

Figure 2:
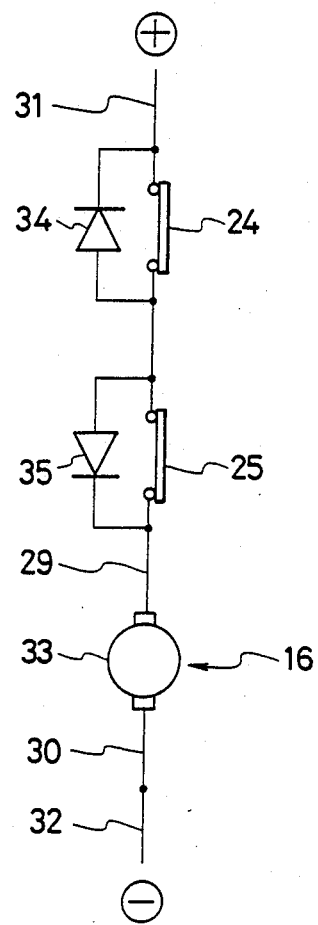
FIG. 2 is an electrical schematic of the overload detection mechanism of FIG. 1.

The linear actuator of FIG. 1 comprises an operating rod 15 adapted to be moved linearly by an electric motor 16, and to be stopped automatically at both ends of its stroke, and also when an overload occurs in mid stroke. Automatic stopping of the operating rod both at the ends of its stroke and under mid-stroke overload conditions is achieved by an overload detection mechanism at the proximal end of the operating rod.

The linear actuator comprises a casing 1 with a cylindrical large diameter bore 2 and a small diameter bore 3, coaxial with bore 2, at the front end thereof. An annular step is formed where the large and small diameter bores meet. An outer sleeve 4 is fixed to the front end of casing 1, and a cover 6 is fixed to a flange 5 at the rear of the casing. Cup-shaped spring seats are slidably fitted in the large diameter bore 2. Each of the cup-shaped spring seats is preferably formed as a unit. These cup shaped spring seats have generally cylindrical axially extending parts 7' and 8', the open ends of which are opposed to each other. The ends of the spring seats oppoiite to the open ends have radial spring-engaging faces, and are fitted with bearings 9, the inner races of which slidably support the cylindrical shank 11 of a screw shaft 10. The cup-shaped spring seats have external stepped portions, which are engageable with stops which limit rightward travel of spring seat 7 and leftward travel of spring seat 8. The external step of front spring seat 7 norally abuts the annular step formed where the large and small diameter bores 2 and 3 meet. The corresponding external step of rear spring seat 8 normally abuts a stop ring 8, which is engaged in a slot in the inner wall of caing 1. A coiled compression spring 13 is held between the two spring seats 7 and 8, and is preloaded to a predetermined stress. While the external steps of the cup-shaped spring seats are conveniently utilized to limit the rightward and leftward movement of the spring seats 7 and 8 respectively, these steps may be omitted, and the outer races of the bearings 9, for example, may be used for the same purpose. The inner race of each bearing engages a fixed abutment on the screw shaft so that the lefthand bearing moves with the screw shaft as the shaft moves to the right, and so that the right hand bearing moves with the screw shaft as the shaft moves to the left.

A travelling nut 14 is threaded onto the screw shaft 10 at a location forward of the shank 11, and operating rod 15 is fixed to nut 14. At the distal end of the operating rod, provisions are made for attachment of the operating rod to the mechanism which is to be operated by the linear actuator. Preferably, the operated mechanism itself prevents rotation of the operating rod 15, and thereby prevents rotation of the travelling nut 14. However, as an alternative, suitable keys and keyways (not shown) can be provided on the operating shaft and on the outer sleeve to prevent the travelling nut from rotating. The rear end of the shank 11 is coupled with the output shaft 17 of a permanent magnet D.C. motor 16 through a train of gears 18, 19 and 20 located within cover 6.

A switch box 23 is mounted in a casing 21, which is fixed on casing 1 f the actuator. An opening of casing 21 faces a window 22 of casing 1, and switch box 23 extends into the window 22. Switch box 23 contains a pair of self-resetting limit switches 24 and 25, which may be conventional microswitches having operating members 26 and 26'. Each operating member toggles its switch to an opposite condition when depressed, and is spring-loaded so that the switch returns to its original condition when the operating member is released.

The operating members 26 and 26' protrude upwardly through window 22 in casing 1 so that they can be pushed downwardly when engaged by bevelled surfaces 27 and 27' formed at the ends of the axially extending portions 7' and 8' respectively of the cup-shaped spring seats 7 and 8. Therefore, when spring seat 7 moves to the left, switch 24 is actuated, and when spring seat 8 moves to the right, switch 25 is actuated. Thus, the axially extending portions 7' and 8' of the cup-shaped spring seats not only serve to hold the compression spring 13 but also function as strikers for the limit switches.

The bevelled surfaces of portions 7' and 8' are circumferentially uniform. That is, each bevelled surface is uniform around the entire circumference of the axially extending portion of the spring seat. Therefore, even though the spring seats may rotate in bore 2 about the axis of the screw shaft, this makes no difference in the manner in which the switch operators are engaged. It is unnecessary to provide keys and slots, or the like, in order to prevent the spring seats from rotating.

In FIG. 1, and also in FIG. 2, motor leads are shown at 29 and 30 and power supply lines are shown at 31 and 32.

Referring to FIG. 2, the self-resetting limit switches 24 and 25 are connected in series with armature 33 of motor 16. Diodes 34 and 3 are connected in opposite directions across the contacts of the respective switches.

If current is conducted to armature 33 with wire 31 positive as indicated, operating rod 15 is advanced toward the right in FIG. 1. If the operating rod encounters a excessive load, the thrust imposed on the rod is transmitted to coil spring 13 through spring seat 7. As soon as the thrust exceeds the predetermined load on the spring, spring seat 7 begins to move to the left in FIG. 1. When the thrust reaches a predetermined overload value, the bevelled surface 27 of spring seat 7 actuates the operating member 26 of switch 24 to open the switch. As a result, armature 33 is disconnected from the power source and the motor 16 is stopped, which causes the operating rod to stop. If the stopping of the motor is due to a mid-stroke overload condition, switch 24 will automatically reclose when the overload condition is removed. However, i the stopping of the motor occurred because the operating rod reached the forward limit of its stroke, spring seat 7 is not returned by the pressure of spring 13 after the actuator stops, and consequently switch 24 remains open.

If the polarity of the applied voltage is reversed so that wire 31 is negative, diode 34 conducts current to rotate armature 33 in the reverse direction. As a result, the operatng rod 15 is retracted, and spring seat 7 is pushed forward by spring 13, automatically returning switch operating member 26 to its original condition to close switch 24.

If an overload condition occurs during retraction of the operating rod 15, spring seat 8 is advanced to push operating member 26' downward thereby opening switch 25 to stop rotation of the motor. Operation of the overload detection mechanism during retraction of the actuator is essentially the same as operation during advancement of the actuator.

As will be apparent, the limit switches serve not only as overload detectors but also as stroke-end detectors. In the case of a mid-stroke overload, operation can be restored by removing the overload condition, or by reversing the polarity of the applied voltage to reverse the direction of the motor. However, at either end of the stroke, operation can only be restored by reversing polarity.

While the switch assembly of FIG. 1 comprises a pair of self-resetting switches having operators which are depressed by the bevelled ends of the spring seats, alternative forms of switches can be used. For example, as shown in FIG. 3, the switch operator can be a single tilting operating member 26A disposed midway between the ends of the axially extending parts of the spring seats. The switch contacts and electrical connections remain as shown in FIG. 2. Tilting of the operator to one side opens one set of switch contacts, while tilting of the operator in the opposite direction opens the other set of switch contacts. The operator is normally in a middle position in which both sets of switch contacts are closed, and is automatically spring-returned to the middle position when released by the spring seats.

Using the axially extending parts of the spring seats as strikers for the limit switch operators, it is unnecessary to provide separate strikers. Furthermore, with the switch operator-engaging surfaces extending around the entire circumference of the ends of the spring seats, the spring seats can rotate in bore 2 without affecting the operation of the switches. Thus it is unnecessary to provide special guides for switch strikers. The result is a very simple, inexpensive and compact overload detection mechanism.

We claim:

1. In a linear actuator comprising a motor-driven screw shaft, an overload detection mechanism comprising a pair of cup-shaped spring seats with substantially cylindrical portions, said spring seats being mounted at one end of the screw shaft by means of a pair of bearings and having a spring therebetween under a predetermined preload, and limit switch means for detecting overload on the screw shaft as a result of axial movement of the spring seats, characterized in that said cylindrical portions of the cup-shaped spring seats are arranged to serve as strikers for said limit switch means.

2. In a linear actuator comprising a motor-driven screw shaft and a nut threaded onto said shaft and arranged to travel thereon as said shaft rotates, an overload detection mechanism comprising first and second up-shaped spring seats arranged to slide parallel to the axis of said shaft, each cup-shaped spring seat having an axially extending substantially cylindrical portion and said portions having open ends facing each other, means for limiting movement of said spring seats so that said first spring seat remains stationary and the second spring seat moves toward the first spring seat as the screw shaft moves axially in one direction, and so that said second spring seat remains stationary and said first spring seat moves toward said second spring seat as the screw shaft moves axially in the opposite direction, spring means held between said spring seats, and limit switch means having operating means arranged to be engaged by said axially extending portions of the spring seats.

3. A linear actuator according to claim 2 having a casing surrounding said spring seats, said casing having a bore with a cylindrical wall and said spring seats being slidable in said bore with their substantially cylindrical axially extending elements being in sliding contact with said cylindrical wall, said wall having a radial opening and said operating means of said limit switch means extending through said radial opening inwardly beyond said wall whereby said operating means is capable of being engaged by said axially extending elements of the spring seats when said spring seats move axially in said bore.

4. A linear actuator according to claim 2 in which said cup-shaped spring seats are rotatable about the axis of said shaft and in which said axially extending portions of the spring seats have circumferentially uniform switch operator engaging surfaces.

5. A linear actuator according to claim 2 in which said operating means of the limit switch means are radially movable relative to the axis of the screw shaft whereby said switch means are operated when said operating means are pushed radially outward, in which said cup-shaped spring seats are rotatable about the axis of said shaft, and in which said axially extending portions of the spring seats have circumferentially uniform bevelled switch operator-engagaging surfaces.

6. A linear actuator according to claim 2 having a casing surrounding said spring seats, said casing having a bore with a cylindrical wall and said spring seats being slidable in said bore with their substantially cylindrical axially extending elements being in sliding contact with said cylindrical wall, said wall having a dial opening and said operating means of said limit switch means extending through said radial opening inwardly beyond said wall whereby said operating means is capable of being engaged by said axially extending elements of the spring seats when said spring seats move axially in said bore, in which said operating means of the limit switch means are radialy movable relative to the axis of the scew shaft whereby said switch means are operated when said operating means are pushed radially outward, in which said cup-shaped spring seats are rotatable in said bore about the axis of said shaft, and in which said axially extending portion of the spring seats have circumferentially uniform bevelled switch operator-engaging surfaces.

* * * * *